United States Patent Office 2,794,013
Patented May 28, 1957

2,794,013

REACTION PRODUCTS OF VINYLENE CARBONATE AND AMMONIA OR PRIMARY AMINE

Erhart K. Drechsel, Springdale, Conn., assignor to American Cyanamid Company, New York, N. Y., a corporation of Maine No Drawing. Application December 23, 1953,
Serial No. 400,107

12 Claims. (Cl. 260—77.5)

This invention relates to the production of new synthetic materials and, more particularly, new resinous (or potentially resinous) compositions which are especially suitable for use in the plastics and coating arts, and which are obtained by reaction between an unsaturated ester, specifically a vinylene ester, and a particular kind of nitrogenous compound. Still more particularly the invention is concerned with compositions comprising the product of reaction of ingredients comprising vinylene carbonate and at least one nitrogenous compound selected from the class consisting of ammonia, primary amines (including both the primary monoamines and polyamines) and the secondary amines (including both the secondary monoamines and polyamines). The scope of the invention also includes method features.

Illustrative examples of amines that can be used as a reactant with vinylene carbonate are the alkanol monoamines, e. g., the ethanol monoamines, propanol monoamines, etc., containing at least one hydrogen atom attached to the amino nitrogen atom; the hydrocarbon-substituted monoamines containing at least one hydrogen atom attached to the amino nitrogen atom, e. g., the primary and secondary, saturated aliphatic (including cycloaliphatic) hydrocarbon monoamines, the primary and secondary aromatic hydrocarbon monoamines, the primary and secondary, aromatic-substituted aliphatic hydrocarbon monoamines, and the aliphatic-substituted aromatic hydrocarbon monoamines; the polyalkylene polyamines containing at least one amine grouping having at least one hydrogen atom attached to the amino nitrogen atom; and others that will be apparent to those skilled in the art from the foregoing general examples and from the more specific examples given hereinafter. Thus, it will be apparent that there also can be used amines containing one or more (e. g., two, three, four, five or higher number) primary amino groups together with one or more (e. g., two, three, four, five or higher number) secondary amino groups, with or without hydroxyl or other active or inactive groups (e. g., tertiary amino groups) attached to the chain. Hydrazine and substituted hydrazines containing at least one hydrogen atom attached to an amino nitrogen atom also can be employed as the amine reactant with vinylene carbonate.

Vinylene carbonate, which is a cyclic carbonate of an enediol, has the following formula:

I 

Pure vinylene carbonate is a colorless liquid, M. P. 22° C. and B. P. 162° C. at 735 mm. It can be prepared, for example, by the dehydrochlorination of monochloroethylene carbonate as described by Newman et al. in J. A. C. S., vol. 75, pp. 1263–4 (March 5, 1953).

It is a primary object of the present invention to prepare a new class of synthetic materials, more particularly resinous compositions, which have particular utility in the plastics and coatings arts, e. g., as coating, laminating, adhesive, impregnating, casting and molding compositions as well as in other applications, for instance, in the treatment of textiles, paper, etc. They also may be used as components of plastics and coatings compositions. Other objects of the invention will be apparent to those skilled in the art as the description of the invention proceeds.

The present invention is based on my discovery that new and valuable materials for use in coating, molding and other applications can be prepared by effecting reaction between ingredients comprising vinylene carbonate and at least one nitrogenous compound selected from the class consisting of (1) ammonia, (2) primary amines and (3) secondary amines. Mixtures of any two or all three of the nitrogenous compounds of (1), (2) and (3) in any proportions can be used, if desired. When ammonia or a primary saturated aliphatic monoamine is employed as a reactant with vinylene carbonate the initial reaction which takes place may be illustrated by the following equation and for purpose of specific illustration ammonia is shown as the nitrogenous compound employed:

II 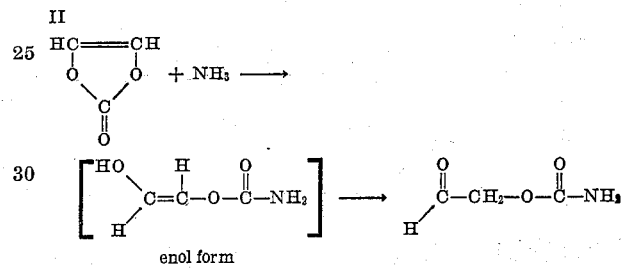

enol form

The reaction product of Equation II is capable of undergoing interreaction between molecules thereof as illustrated by Equation III below:

III 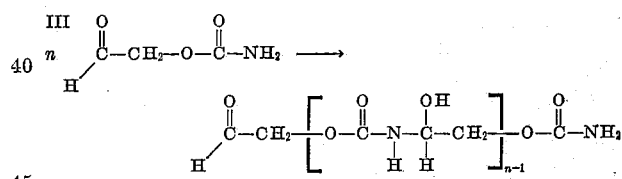

For the reasons indicated in the foregoing equations it is difficult to isolate a pure monomeric substance directly.

As has been mentioned hereinbefore, vinylene carbonate also reacts with secondary amines. Taking a dialkyl amine as illustrative of the secondary amine, the initial reaction may be illustrated by the following equation:

IV 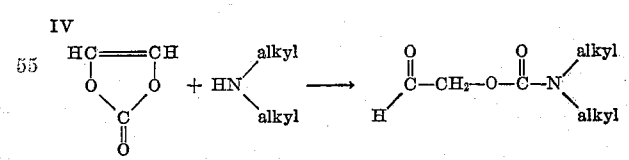

The complete reaction between the secondary amine and the vinylene carbonate may not be as simple as Equation IV might imply, since products other than the pure aldehyde generally are obtained. It is possible that the aldehyde, which initially forms, reacts preferentially with additional amine reactant.

In addition to ammonia and the monoamines indicated in the foregoing equations, vinylene carbonate also reacts with polyamines containing at least one hydrogen atom attached to an amino nitrogen atom. The reaction of vinylene carbonate with such polyamines may be illustrated by the following equation wherein a polyamine represented by the formula $H_2N-R-NH_2$, where R represents an alkylene radical, is taken as illustrative of the amine reactant:

V

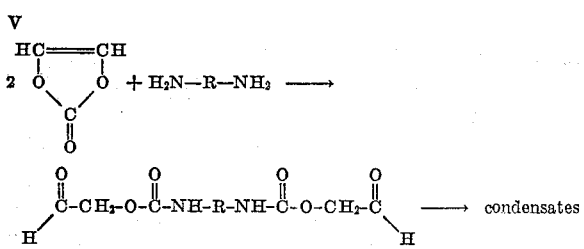

The type of reaction indicated in Equation V represents an unique case whereby an unsaturated monomer (fully capable of addition or free radical polymerization) undergoes polymerization in a condensation sense or fashion, without attendant elimination of some simple molecule, e. g., water, ammonia, sodium chloride, etc.

As indicated hereinbefore, vinylene carbonate also reacts with primary and secondary aromatic amines. With such amines an additional possibility for condensation presents itself in that the intermediate aldehyde may react with the reactive nuclear hydrogen. Taking aniline as illustrative of the aromatic amine reactant, the reaction may be illustrated by the following equation:

VI

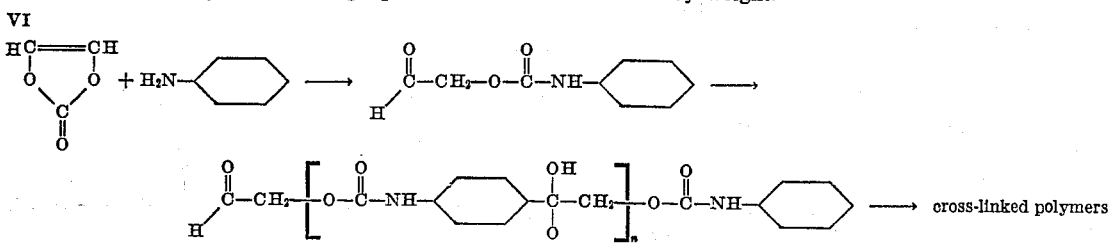

The initial reaction products of this invention are generally soluble in water, or in other solvents, but become insoluble upon further advancement of polymerization, that is, become substantially cured. Many of the synthetic compositions of this invention, as initially prepared, are thermosetting (or potentially thermosetting) in nature and can be cured under heat in the form of films or moldings without the aid of a curing catalyst.

The proportions of the reactants can be widely varied depending, for example, upon the particular starting reactants employed and the conditions of the reaction. In general, approximately equal molar proportions are employed when ammonia or a primary or secondary monoamine is the nitrogenous compound employed. With both the primary and secondary monoamines and the polyamines the proportions of the amine are such that at least one primary or secondary amine group is present therein for each mole of vinylene carbonate employed.

The temperature of the reaction also can be varied considerably depending, for instance, upon the particular reactants employed, the rapidity of the reaction wanted, the particular properties desired in the reaction product, and other influencing factors. For example, the reaction temperature can be varied from room temperature (20°–30° C.) up to about 100° C., preferably not higher than about 60° or 65° C. if the reaction can be caused to proceed at the lower temperatures. The reaction mass is cooled, if necessary, in order to keep the temperature thereof to the optimum temperature of reaction.

The reaction can be effected in the absence of a solvent or other additive, or in the presence of (i. e., intimately associated with) a relatively inert solvent (e. g., water, benzene, toluene, xylene, dioxane, acetone, ethyl methyl ketone, methyl isobutyl ketone, chlorobenzene, chloroform, ethylene dichloride, methanol, ethanol, propanol, butanol, pentanol, hexanol, allyl alcohol, methallyl alcohol, benzyl alcohol and other monohydric alcohols, including those belonging to the saturated and unsaturated aliphatic and aromatic-substituted aliphatic series; the various liquid alcohol-ethers, for example, ethylene glycol monomethyl ether, ethylene glycol monoethyl ether, diethylene glycol monomethyl ether, diethylene glycol monoethyl ether, etc.; as well as numerous others that will be apparent to those skilled in the art. An excess of the amine reactant over stoichiometrical proportions may constitute the medium in which the reaction is effected. The inert or active liquid medium or additive, if employed, can be used in any suitable amount ranging, for instance, from 0.1 to 40 or 50 times that of the weight of the primary reactants (vinylene carbonate and amine in reactive proportions). Good results have been obtained when the liquid reaction medium was employed in an amount such that the primary reactants constituted from about 20% to about 30 or 35% by weight of the reaction mass. At the end of the reaction period, the inert or unreacted liquid medium is then removed from the reaction mass by any suitable means, for example by distillation, decantation, etc., or the solid reaction product can be separated from the liquid component of the reaction mass by filtration, centrifuging, etc.

In order that those skilled in the art better may understand how the present invention can be carried into effect, the following examples are given by way of illustration and not by way of limitation. All parts and percentages are by weight.

*Example 1*

|  | Parts | Approx. Molar Ratio |
|---|---|---|
| Vinylene carbonate | 86.0 | 1 |
| Aqueous ammonia (approx. 29% NH₃) | 58.6 | 1 |

The aqueous ammonia is added to the vinylene carbonate at room temperature (25° C.). The reaction is extremely vigorous, the temperature rapidly rising to 45° C. The reaction mass is maintained below 50° C. by external cooling. The lemon color which develops almost immediately persists throughout the reaction and is not extracted by either benzene or hexane. The viscous, oily reaction product that is obtained may be used as a component of paints and other coating compositions where lightness of color is not a matter of primary importance.

*Example 2*

|  | Parts | Approx. Molar Ratio |
|---|---|---|
| Vinylene carbonate | 86.0 | 1 |
| Methanolic ammonia (approx. 10% NH₃) | 170.0 | 1 |

The reaction is carried out in the same manner as described under Example 1 and is equally as vigorous. However, little or no color develops during the reaction period. When the exothermic reaction has subsided a portion of the reaction mass is evaporated to dryness, leaving an amber-colored, sticky, viscous oil. When this oil is heated at 80° C. for 2 hours a hard and brittle, but still water-soluble film, is formed. When this film is heated for an additional 2 hours at 125° C., it is much less water sensitive.

The product of this example advantageously may be used as an impregnating composition, or as a modifier (e. g., a plasticizer) of other compatible synthetic resins that are deficient in plasticity characteristics.

Example 3

|  | Parts | Approx. Molar Ratio |
|---|---|---|
| Vinylene carbonate | 86.0 | 1 |
| Butyl amine (monobutyl amine) | 73.0 | 1 |

The above reactants are brought into contact with each other at 25°–30° C., the monobutyl amine reacting exothermically with the vinylene carbonate in the absence of a solvent or diluent. The reaction product is an amber-colored oil which yields a soft film after heating at 125° C. for 5 hours. It is suitable for such uses as indicated above with reference to Examples 1 and 2.

Example 4

|  | Parts | Approx. Molar Ratio |
|---|---|---|
| Vinylene carbonate | 86.0 | 1 |
| Diethyl amine | 73.0 | 1 |

As in the case of the monobutyl amine employed in Example 3, the diethyl amine used in this example reacts exothermically with the vinylene carbonate in the absence of a solvent or diluent. The reaction product is a dark-colored liquid that can be used in various coating, impregnating and adhesive applications.

Example 5

|  | Parts | Approx. Molar Ratio |
|---|---|---|
| Vinylene carbonate | 86.0 | 1 |
| Piperidine | 85.0 | 1 |

The reaction between the above ingredients is carried out in the same manner as described in the preceding examples. A dark-colored oil that has properties and uses similar to the product of Example 4 is obtained.

Example 6

|  | Parts | Approx. Molar Ratio |
|---|---|---|
| Vinylene carbonate | 86.0 | 1 |
| Monoethanolamine | 61.0 | 1 |

The monoethanolamine is added dropwise to the vinylene carbonate at 25° C. The resulting exothermic reaction is maintained below 40° C. by external cooling of the reaction vessel. An amber-colored oil is obtained. This oil solidifies when heated at 125° C. for 3 hours. The resulting solid is a soft, resilient mass. The product of this example can be used, for example, as a modifier of natural and synthetic rubbers, or as a plasticizer of compatible synthetic resins and molding compositions that normally are deficient in plasticity characteristics.

Example 7

|  | Parts | Approx. Molar Ratio |
|---|---|---|
| Vinylene carbonate | 86.0 | 1 |
| 3-aminopropanol | 75.0 | 1 |

The same procedure as described under Example 6 is followed. The resulting product is somewhat softer than the product of Example 6 and has uses such as were mentioned above with reference to the product of that example.

Example 8

|  | Parts | Approx. Molar Ratio |
|---|---|---|
| Vinylene carbonate | 172.0 | 2 |
| Ethylene diamine (approx. 85%) | 70.6 | 1 |

The ethylene diamine (approximately 85% ethylene diamine and the remainder water) reacts vigorously with the vinylene carbonate when the two reactants are admixed at 25°–30° C. The resulting viscous, amber-colored oil yields a hard, brittle, water-insoluble film after heating for 2.5 hours at 125° C. The oily reaction product can be used as a coating and impregnating composition, or as a component of such compositions. It also can be mixed with dyes, pigments, fillers, opacifiers and/or other additives to produce molding compositions of various kinds.

Example 9

|  | Parts | Approx. Molar Ratio |
|---|---|---|
| Vinylene carbonate | 172.0 | 2 |
| Hexamethylene diamine (approx. 85%) | 136.5 | 1 |

Essentially the same procedure is followed as is described in Example 8. (The amine reactant is approximately 85% hexamethylene diamine and the remainder water.)

The resulting, cured films are hard but less brittle and considerably tougher than the product of Example 8. The product of this example has fields of utility which, in general, are the same as those just mentioned with reference to the product of Example 8.

Example 10

|  | Parts | Approx. Molar Ratio |
|---|---|---|
| Vinylene carbonate | 129.0 | 3 |
| 3,3'-Imino-bis-(propylamine) | 131.0 | 2 |

The imino-bis-(propylamine) reacts vigorously with the vinylene carbonate at 25°–30° C. to yield a viscous, amber-colored oil. When this oil is heated for 3 hours at 125° C., a hard, brittle, resinous mass is formed. The oily reaction product can be used as an adhesive, laminating or impregnating composition, or as a component of such compositions, as well as in the production of molding (moldable) compositions from which molded articles are formed under heat and pressure.

Example 11

|  | Parts | Approx. Molar Ratio |
|---|---|---|
| Vinylene carbonate | 176.0 | 2 |
| Triethylene tetramine | 146.0 | 1 |

The same procedure is followed as described under Example 10. The reaction product is a soft, sticky, amber-colored solid. When this solid is placed on a hot plate at 140° C. it fuses to a hard, brittle, resinous mass.

Example 12

|  | Parts | Approx. Molar Ratio |
|---|---|---|
| Vinylene carbonate | 86.0 | 1 |
| Aniline | 93.0 | 1 |

The aniline is added to the vinylene carbonate at 25°–30° C. The two compounds are completely miscible at this temperature but give no indication of reaction therebetween. However, upon warming the mixture to 60° C., an exotherm carries the temperature to 75° C. After an hour in a 60°–70° C. oven, the amber-colored reaction product becomes quite viscous. A coating composition is produced by dissolving this viscous oil in xylene. Films of this solution, after being cured by heating for 3 hours at 125° C., are hard and tough.

Example 13

|  | Parts | Approx. Molar Ratio |
|---|---|---|
| Vinylene carbonate | 86.0 | 1 |
| o-Toluidine | 107.0 | 1 |

Essentially the same procedure is followed as described under Example 12. Films deposited from a xylene solution of the reaction product, after being cured by heating for 3 hours at 125° C., are hard and tough but are somewhat lighter in color than the similarly produced and cured reaction product of Example 12 wherein aniline was the amine reactant employed.

Example 14

|  | Parts | Approx. Molar Ratio |
|---|---|---|
| Vinylene carbonate | 258.0 | 3 |
| Butyl amine | 73.0 | 1 |
| 3,3'-Imino-bis-(propylamine) | 131.0 | 1 |

The two amines are admixed and then added slowly to vinylene carbonate at 25°–30° C. Films of the resulting reaction product, when cast upon a glass plate and then cured by heating for 2 hours at 125° C., are considerably softer and less brittle than the corresponding product of Example 10 wherein 3,3'-imino-bis-(propylamine) alone constituted the amine reactant.

Example 15

|  | Parts | Approx. Molar Ratio |
|---|---|---|
| Vinylene carbonate | 258.0 | 3 |
| Aniline | 93.0 | 1 |
| Hexamethylene diamine (approx. 85% diamine; remainder water) | 136.5 | 1 |

The mixture of amine reactants is added slowly to the liquid vinylene carbonate at 25°–30° C. The reaction mass is warmed to about 60° C. and then is placed in a 60°–70° C. oven for about 1 hour. The resulting reaction product is dissolved in xylene to form a coating composition. Films of this solution, after being cured by heating for 2 hours at 125° C., are considerably more flexible than the corresponding product of Example 12 wherein aniline alone constituted the amine reactant.

It will be understood, of course, by those skilled in the art that my invention is not limited to the specific reactants, proportions thereof and conditions of reaction given by way of illustration in the foregoing examples. For instance, instead of carrying out the reaction in the presence of water or methanol, as in certain of the examples, the reaction can be effected while the vinylene carbonate and amine reactant are dissolved or dispersed in various other liquid media, numerous examples of which have been given hereinbefore. Also, instead of the particular amine reactant or mixture of amine reactants set forth in the individual examples, the reaction with vinylene carbonate will proceed, to the best of my knowledge and belief, with any other primary or secondary amine, or with mixtures thereof in any proportion, or with any amines containing one or more primary amino groups and, also, one or more secondary amino groups, with or without additional tertiary amino groups. Thus, the amine reactant can be, for example, ammonia or other nitrogenous compound having at least one radical represented by the formula VII 

where R represents hydrogen and R' represents hydrogen or any monovalent organic (carbon-containing) radical, e. g., a hydrocarbon radical, a hydroxyhydrocarbon radical (e. g., hydroxyethyl, hydroxyphenyl, hydroxyxylyl, etc.), a heterocyclic radical (e. g., furyl, furfuryl, etc.), the radical —NH—NH$_2$ and higher members of the homologous series, etc. Other illustrative examples of hydrocarbon and hydroxyhydrocarbon radicals which R' in Formula VII can represent are given, for instance, in Patent No. 2,582,594, dated January 15, 1952, column 2, lines 20–54. Additional examples of sub-classes and of species of primary and secondary amines (amino-containing bodies) that can be used as a reactant with vinylene carbonate in practicing the present invention are given elsewhere in this same Patent No. 2,582,594.

Among the species of primary and secondary amines that are useful (either singly or a plurality thereof, as desired or as may be required in order to obtain a product having the desired properties) as a reactant with vinylene carbonate, which may be designated a "masked aldehyde," may be mentioned the following:

Methyl amine (monomethylamine)
Dimethyl amine
Ethyl amine
Propyl amine
Dipropyl amine
N-ethylbutyl amine ($C_2H_5NHC_4H_7$)
Dibutyl amine
2-amino-4-methylpentane [$CH_3CHNH_2CH_2CH(CH_3)_2$]
n-Amyl amine
Di-n-amyl amine
Hexyl amine
Dihexyl amine
Heptyl amine
Diheptyl amine
Octyl amine
Dioctyl amine
Decyl amine
Didecyl amine
Octadecyl amine
Dioctadecyl amine
1,3-diaminopropane
3-diethylaminopropyl amine
  [($C_2H_5$)$_2NCH_2CH_2CH_2NH_2$]
1,3-diaminobutane ($NH_2CH_2CH_2CHNH_2CH_3$)
1,3-bis-ethylaminobutane
  [$C_2H_5NHCH_2CH_2CHNH(C_2H_5)CH_3$]
1,4-diaminobutane
1,5-diaminopentane
1,6-diaminohexane
1,7-diaminoheptane
1,8-diaminooctane
Triethylene tetramine [$NH_2(CH_2CH_2NH)_2CH_2CH_2NH_2$]
Tetraethylene pentamine Pentaethylene hexamine
Propylenediamine (1,2-diaminopropane)
Diethanolamine
Hydroxyethyl ethylenediamine
Monoisopropanolamine
Diisopropanolamine
Bis (3-aminopropyl) ether
 ($NH_2CH_2CH_2CH_2OCH_2CH_2CH_2NH_2$)
Bis(4-aminobutyl) ether
Bis(5-aminoamyl) ether
Bis(6-aminohexyl) ether
o-, m- and p-Phenylenediamines
Benzidine
2-aminobenzidine
Aminoguanidine
Guanidine
Monophenyl biguanide
Hydrazine
1,1-dimethylhydrazine
Semicarbazide
N-butylaniline
m- and p-Toluidines
o-, m- and p-Tolylenediamines
p,p'-Diaminodiphenyl ether
1,4-diaminoanthraquinone
p,p'-Diaminodiphenylmethane
4-amino-2-butanol
1-methylamino-2-propanol ($CH_3NHCH_2CHOHCH_3$)
5-isopropylamino-1-pentanol
 [$HOCH_2CH_2CH_2CH_2CH_2NHCH(CH_3)_2$]
Ethyleneimine
Propyleneimine
Morpholine
Thiamorpholine
2-methylmorpholine
3-ethylmorpholine
3,5-dimethylmorpholine
2,3,5-trimethylmorpholine
Furfuryl amine As indicated hereinbefore and as further shown by a number of the examples, the properties of the fundamental resinous or non-resinous reaction products of this invention can be varied widely by introducing other modifying bodies before, during or after effecting reaction between the primary components. Thus, as modifying agents I may use, for instance, urea and substituted ureas, aminotriazines (e. g., melamine, ammelide, ammeline, etc.), monohydric alcohols, e. g., methyl, ethyl, propyl, isopropyl, butyl, hexyl, n-octyl, 2-ethylhexyl, decyl, dodecyl, cetyl, lauryl, capryl, tetrahydrofurfuryl alcohol, pentanol or mixtures of isomeric pentanols (which mixtures also may include n-pentanol), cyclohexanol, methylcyclohexanol, etc.; polyhydric alcohols, e. g., glycerol, pentaerythritol, dipentaerythritol, mannitol, sorbitol, ethylene glycol, diethylene glycol, and others such as are disclosed, for example, in Schaefer Patent No. 2,481,155; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; phenol and substituted phenols; and the like.

Illustrative examples of other modifying bodies that can be incorporated into the fundamental reaction products, during their preparation or after they have been formed, are melamine-aldehyde condensation products (e. g., melamine-formaldehyde condensation products), urea-aldehyde condensation products (e. g., urea-formaldehyde condensation products), urea-melamine-aldehyde condensation products (e. g., urea-melamine-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol-polycarboxylic acid reaction products, ester gums, water-soluble cellulose derivatives, natural gums and resins such as shellac, rosin, etc.; polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with melamine-formaldehyde resins, fatty oil or fatty oil acid-modified alkyd resins, or other film-forming materials commonly used in protective coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example, in Moore Patent No. 2,218,474, dated October 15, 1940.

Dyes, pigments, driers, curing agents (in some cases where a more accelerated cure is desired), plasticizers, mold lubricants, opacifiers and various fillers (e. g., wood flour, glass fibers, asbestos, mineral wool, mica dust, powdered quartz, titanium dioxide, zinc oxide, talc, china clay, carbon black, etc.) may be compounded by conventional practice with the synthetic materials of my invention, as desired or as conditions may require, in order to provide a coating, molding or other composition best adapted to meet a particular service use. For additional or more detailed information concerning the modifying ingredients that may be employed in producing coating compositions from my resins, reference is made to the aforementioned Moore Patent.

The modified and unmodified reaction products, more particularly resinous reaction products, of this invention have a wide variety of uses. For example, in addition to their use in the production of coating compositions, they may be employed as modifiers of other compatible natural and synthetic resins. Thus, some of them advantageously may be used to improve the plasticity or flow characteristics of thermosetting resins which have insufficient or unsatisfactory plasticity during curing to an insoluble, infusible state, e. g., certain urea-formaldehyde or melamine-formaldehyde resins or molding compositions where better flow during molding, without decreasing the cure time, is desirable. The soluble resins of this invention also can be dissolved in appropriate solvents. Some of the solvents that may be employed to dissolve a particular reaction product of my invention, in addition to others to which reference hereinbefore has been made, include benzene, toluene, amyl acetate, butanol, methyl ethyl ketone, etc. The dissolved resins can be used as laminating varnishes in the production of laminated articles wherein sheet materials, e. g., paper, cloth, sheet asbestos, etc., are coated or coated and impregnated with a resin solution, superimposed and thereafter united under heat and pressure. They also can be employed as an adhesive in making laminated plywood, laminated glass cloth as an impregnant of pulp preforms from which molded articles thereafter are made by subjecting the impregnated preforms to heat and pressure, as impregnants for electrical coils and for other electrically insulating applications, for bonding together abrasive grains in the production of resin-bonded abrasive articles such, for instance, as grindstones, sand papers, etc., in the manufacture of electrical resistors, etc. They also can be used for treating textile materials (e. g., linen, rayon, and other cellulose-containing textiles, wool, silk, and other natural or synthetic proteinaceous textiles, including nylon and textiles derived from polyacrylonitrile and acrylonitrile copolymers, and from casein, soyabeans, etc.), in filament, thread, yarn, fabric (woven or felted) or other forms, in order to improve the properties of such textile materials, e. g., to increase the stiffness, to increase the service life, to impart shrinkage resistance thereto, or otherwise to enhance the properties of the treated materials and to make them more useful or serviceable to the ultimate user. They also may be employed for treating leather to improve its appearance and physical properties.

The claims (both composition and method claims) in the present application involve only certain of the compositions disclosed in the foregoing specification; and, more particularly, they are concerned with compositions comprising the carbamate obtained by reaction, at a temperature of from about 20° C. to about 100° C., of ingredients comprising vinylene carbonate and at least one nitrogenous compound selected from the class consisting of ammonia and primary amines, the latter having only single bonds between any adjacent carbon atoms of any and all straight-chain radicals which are a component thereof, and the said nitrogenous compound being present in an amount sufficient to supply at least one

grouping for each mole of vinylene carbonate.

I claim:

1. A composition comprising the carbamate obtained by reaction, at a temperature of from about 20° C. to about 100° C., of ingredients comprising vinylene carbonate and at least one nitrogenous compound selected from the class consisting of ammonia and primary amines, the latter having only single bonds between any adjacent carbon atoms of any straight-chain radical which is a component thereof, and the said nitrogenous compound being present in an amount sufficient to supply at least one

grouping for each mole of vinylene carbonate.

2. A composition comprising the carbamate obtained by reaction, at a temperature of from about 20° C. to about 100° C., of ingredients comprising vinylene carbonate and ammonia in approximately equal molar proportions.

3. A composition comprising the carbamate obtained by reaction, at a temperature of from about 20° C. to about 100° C., of ingredients comprising vinylene carbonate and a primary amine having only single bonds between any adjacent carbon atoms of any straight-chain radical which is a component thereof, and the said primary amine being present in an amount sufficient to supply at least one

grouping for each mole of vinylene carbonate.

4. A liquid composition comprising (1) a soluble carbamate obtained by reaction, at a temperature of from about 20° C. to about 100° C., of ingredients comprising vinylene carbonate and at least one nitrogenous compound selected from the class consisting of ammonia and primary amines, the latter having only single bonds between any adjacent carbon atoms of any straight-chain radical which is a component thereof, and the said nitrogenous compound being present in an amount sufficient to supply at least one

grouping for each mole of vinylene carbonate; and (2) a solvent for the reaction product of (1).

5. A heat-curable composition comprising a heat-convertible resinous carbamate obtained by reaction, at a temperature of from about 20° C. to about 100° C., of ingredients comprising vinylene carbonate and at least one nitrogenous compound selected from the class consisting of ammonia and primary amines, the latter having only single bonds between any adjacent carbon atoms of any straight-chain radical which is a component thereof, and the said nitrogenous compound being present in an amount sufficient to supply at least one

grouping for each mole of vinylene carbonate.

6. A product comprising the cured composition of claim 5.

7. A composition comprising the carbamate obtained by reaction, at a temperature of from about 20° to about 100° C., of ingredients comprising vinylene carbonate and an alkanol primary monoamine having only single bonds between adjacent carbon atoms of any and all straight-chain radicals which are a component thereof, and the said alkanol primary monoamine being present in an amount sufficient to supply at least one

grouping for each mole of vinylene carbonate.

8. A composition comprising the carbamate obtained by reaction, at a temperature of from about 20° C. to about 100° C., of ingredients comprising (1) vinylene carbonate and (2) an ethanol primary monoamine having only single bonds between adjacent carbon atoms of any and all straight-chain radicals which are a component thereof, the ingredients of (1) and (2) being employed in approximately equal molar proportions.

9. A composition comprising the carbamate obtained by reaction, at a temperature of from about 20° C. to about 100° C., of ingredients comprising vinylene carbonate and a polyalkylene polyamine containing at least one primary amine grouping, the said polyamine having only single bonds between adjacent carbon atoms of any and all straight-chain radicals which are a component thereof, and the said polyalkylene polyamine being present in an amount sufficient to supply at least one

grouping for each mole of vinylene carbonate.

10. A composition comprising the carbamate obtained by reaction, at a temperature of from about 20° C. to about 100° C., of ingredients comprising vinylene carbonate and a primary, hydrocarbon-substituted monoamine having only single bonds between adjacent carbon atoms of any and all straight-chain radicals which are a component thereof, and the said monoamine being present in an amount sufficient to supply at least one

grouping for each mole of vinylene carbonate.

11. A composition comprising the carbamate obtained by reaction, at a temperature of from about 20° C. to about 100° C., of ingredients comprising (1) vinylene carbonate and (2) a primary, saturated aliphatic hydrocarbon-substituted monoamine, the ingredients of (1) and (2) being employed in approximately equal molar proportions.

12. The method of preparing a new synthetic composition which comprises reacting together to form a carbamate, at a temperature of from about 20° C. to about 100° C., ingredients comprising vinylene carbonate and a nitrogenous compound selected from the class consisting of ammonia and primary amines, the latter having only single bonds between any adjacent carbon atoms of any straight-chain radical which is a component thereof, and the said nitrogenous compound being present in an amount sufficient to supply at least one

grouping for each mole of vinylene carbonate.

(References on following page)

References Cited in the file of this patent

UNITED STATES PATENTS

| 2,563,771 | Adelson | Aug. 7, 1951 |
| 2,722,525 | Price et al. | Nov. 1, 1955 |
| 2,733,228 | Salyer et al. | Jan. 31, 1956 |

FOREIGN PATENTS

| 689,705 | Great Britain | Apr. 1, 1953 |

OTHER REFERENCES

Chemical Abstracts, vol. 44, col. 1909, citing Arkiv. Kemi-1, pages 325–30 (1949).